Nov. 15, 1960 V. H. JUNGJOHANN 2,960,094
SLIDE PROJECTOR SHUTTER MECHANISM
Filed Nov. 3, 1958 2 Sheets-Sheet 1
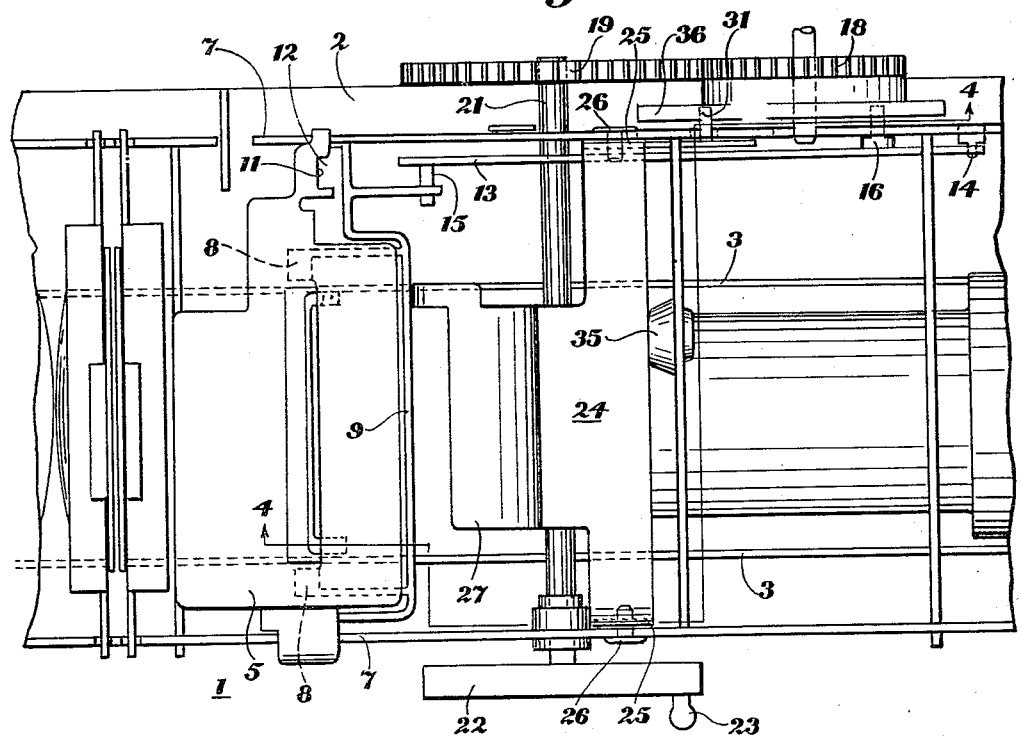
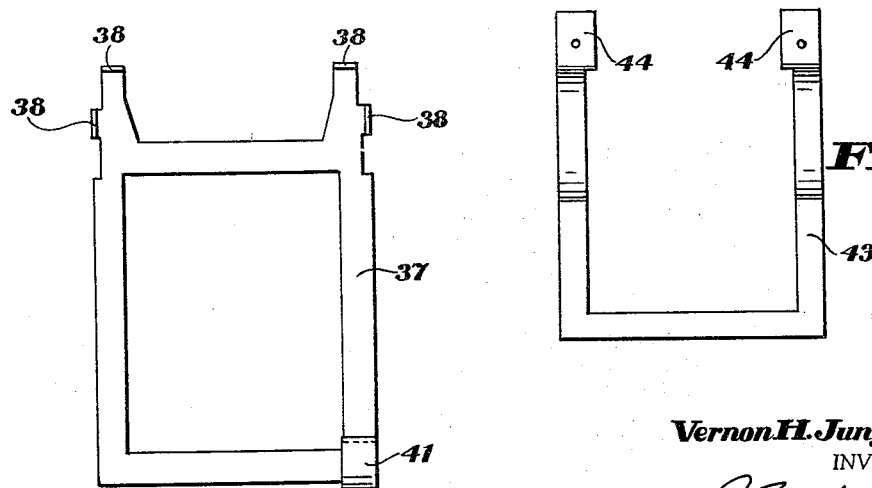
Vernon H. Jungjohann
INVENTOR.

Nov. 15, 1960  V. H. JUNGJOHANN  2,960,004
SLIDE PROJECTOR SHUTTER MECHANISM
Filed Nov. 3, 1958  2 Sheets-Sheet 2
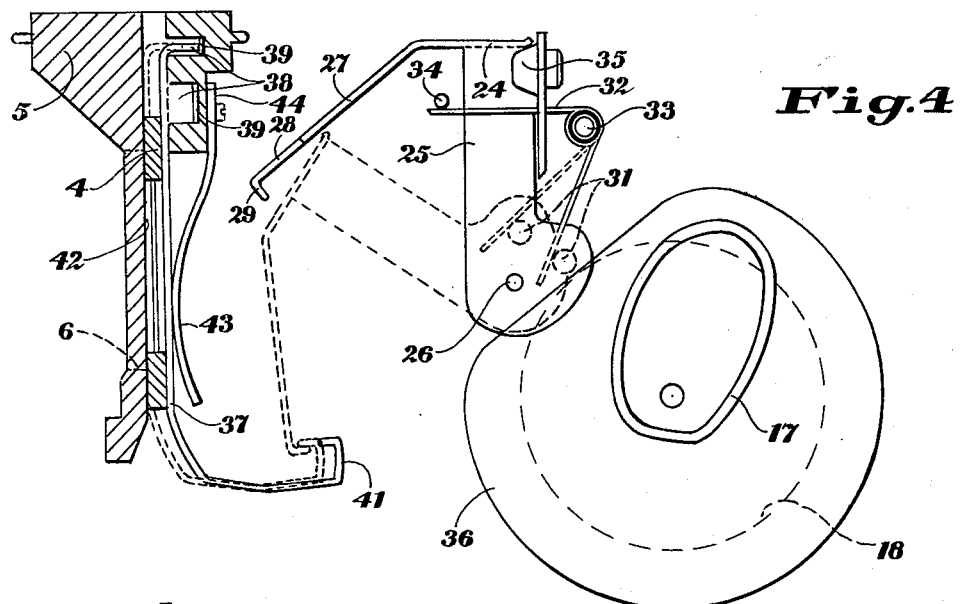
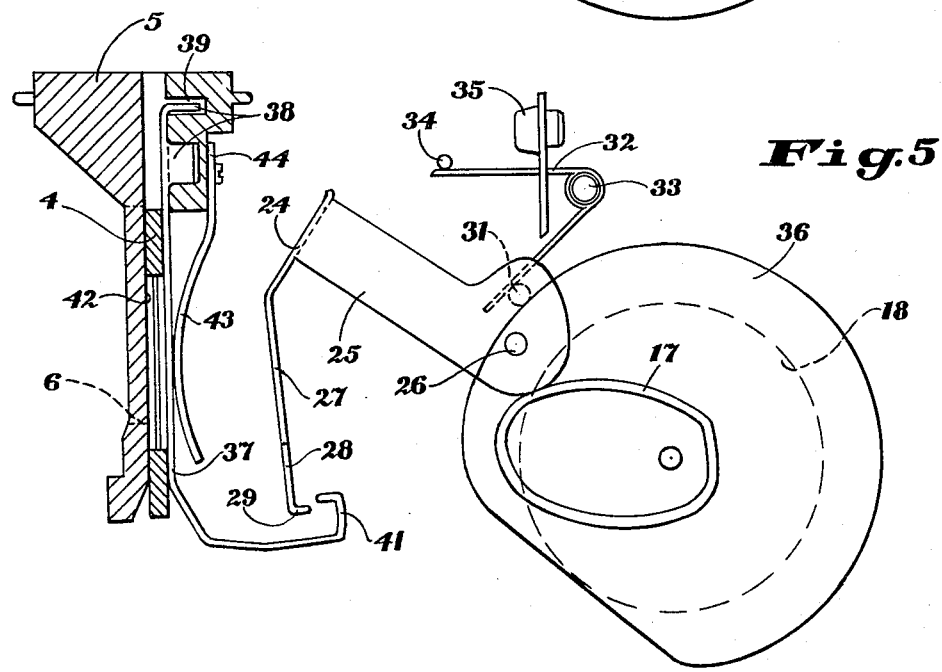
Vernon H. Jungjohann
INVENTOR.
BY R. Frank Smith
Steve W. Grenbaw
ATTORNEYS United States Patent Office 2,960,004
Patented Nov. 15, 1960

2,960,004

SLIDE PROJECTOR SHUTTER MECHANISM

Vernon H. Jungjohann, Rochester, N.Y., assignor to Eastman Kodak Company, Rochester, N.Y., a corporation of New Jersey Filed Nov. 3, 1958, Ser. No. 771,574

11 Claims. (Cl. 88—28)

This invention relates generally to slide projectors, and more specifically to a shutter mechanism for a slide projector.

Slide changers having a shutter mechanism for obstructing the projection aperture so as to prevent the light beam from shining directly upon the screen in the absence of a slide are generally well known in the art. In slide projectors of this general type, the shutter mechanism is alternately moved between an open position permitting light to pass through the slide and aperture, and a closed position preventing light from passing through the aperture. In one form of slide projector, the slide itself is moved into contact with and actuates the shutter mechanism as the slide is moved into the viewing position, that is in register with the aperture. In another form of projector, the operation of the shutter mechanism is completely independent of the presence or absence of a slide in the viewing position. The disadvantage of a shutter mechanism of this latter type is that if the slide advancing mechanism should fail to move a slide into the viewing position, the shutter mechanism will nevertheless open causing the light beam to be projected through the aperture onto the screen which is objectionable. Accordingly, applicants have developed an improved shutter mechanism for a slide projector that is believed to eliminate this objectionable feature of prior known shutter mechanisms.

The primary object of this invention is to provide an improved shutter mechanism for a slide projector movable between open and closed positions, and adapted whenever a slide is absent from the viewing position to remain in the closed position.

Another object of this invention is to provide an improved shutter mechanism having a latch for releasably holding the shutter in a closed position.

Still another object of this invention is to provide an improved shutter mechanism having a latch controlled by the presence or absence of a slide in the viewing position for releasably holding the shutter in a closed position.

One more object of the invention is to provide an improved shutter mechanism for a slide projector that is of simple design and construction, thoroughly reliable and efficient in operation, and economical to manufacture.

Objects and advantages other than those set forth above will be apparent from the following description when read in connection with the accompanying drawings, in which:

Fig. 1 is a fragmentary plan view of a slide projector embodying the shutter mechanism of this invention;

Fig. 2 is a front elevation view of a part of the latch;

Fig. 3 is a front elevation view of the spring that cooperates with the latch structure of Fig. 2;

Figure 4 is a section view taken substantially along line 4—4 of Fig. 1 with the lens, projector housing and other parts omitted for purposes of clarity, and showing the shutter mechanism in an open position in full lines for a fixed position of the cam with the slide in a viewing position, and in a closed position with the latch engaged in dotted lines for the same position of the cam with the slide absent from the viewing position; and Fig. 5 is a view similar to Fig. 4 showing the shutter mechanism after it has been moved into a closed position by the cam.

As shown in the drawings, a preferred embodiment of this invention is illustrated as applied to a slide projector 1, only a part of which is shown, having a base 2 provided with a track 3 for receiving and guiding a tray, not shown, of slides 4 which are to be projected. A slide-receiving member 5 having an aperture 6 shown dotted in Figs. 4 and 5 is mounted on frame members 7 above the track 3 in a position to receive slides 4 which are vertically lifted out of the tray. A slide advancing mechanism for lifting a slide 4 from the tray and moving it into register with the aperture 6 for viewing comprises grippers 8 shown dotted, secured to a vertically movable frame support 9. The support is guided for reciprocal movement in a vertical direction by a slot 11 formed by the slide-receiving member 5 slidably receiving a rib 12 formed by the support 9. Reciprocal movement is imparted to the frame support 9 by a lever 13 having one end pivoted at 14 and the opposite end 15 connected to the support 9. The lever 13 is provided intermediate its ends with a lug 16 adapted to ride in a cam groove 17 as best seen in Figs. 4 and 5, formed by a molded gear member 18. The gear 18 is driven by another gear 19 mounted on one end of a shaft 21, the opposite end having a disk 22 secured thereto provided with a knob 23 to form a crank. It is obvious that rotation of the crank 23 causes the cam groove 17 to impart pivotal movement to the lever 13 which in turn causes the frame support 9 of the slide advancing mechanism to be reciprocally moved in a vertical direction for advancing and retracting slides 4 from the slide receiving member 5.

The shutter mechanism for the projector 1 comprises a shutter member 24 having depending, spaced-apart arms 25 mounted on pivots 26 carried by the projector frame 7 for pivotally mounting the shutter member. The shutter member 24 is provided with a light-blocking flap 27 for intercepting the projector light beams when a slide 4 is absent from the slide receiving member 5, and a finger having a lip 29 for a purpose to be explained hereinafter. One of the arms 25 is provided near its pivot 26 with a pin 31 projecting through an arcuate slot, not shown, in the frame support 7. A spring 32 mounted on a lug 33 formed by the frame 7 has one end butting up against a stop 34 formed by the frame 7 and the opposite end in engagement with the pin 31 for urging the shutter member 24 in a clockwise direction into an open position. The frame 7 also supports a rubber bumber 35 for absorbing the impact of the shutter member 24 and to provide a stop for the shutter member as it is urged by the spring 32 into the open position. A cam 36 formed by the gear member 18 is adapted upon rotation to engage the pin 31 and urge the shutter member 24 into a closed position against the bias of the spring 32 as seen in Fig. 5.

The shutter latch mechanism comprises an essentially L-shaped aperture pad 37 as best seen in Fig. 2 having turned-in end portions 38 projecting into slots 39 formed by the slide-receiving member 5. The slots permit limited movement of the pressure pad 37 in a direction along the optic axis of the projector 1, but prevents vertical or sideways movement thereof. The pressure pad 37 is provided at the other end along one side with a hook 41 adapted to releasably hold the lip 29 and shutter member 24 in a closed position when a slide 4 is absent from the slide receiving member 5 as seen dotted in Fig. 4. The pressure pad 37 further serves to urge a slide which has been advanced into the slide receiving member 5 into contact with seats 42 formed thereby for properly positioning the slide 4 for projection. The pressure pad 37 is urged toward the seats 42 by a substantially U-shaped spring 43 as seen in Figs. 3, 4 and 5 whose ends are secured to the slide-receiving member 5 by any suitable means.

Since rotation of the gear 18 controls movement of the slide advancing and shutter mechanism, it is obvious that by properly constructing the shape of the cam 36 and of the cam groove 17 that the mechanisms can be moved in timed relation so that the shutter mechanism 24 is in a closed position while the slide 4 is being transported to and retracted from the viewing position, and in an open position only during the time interval that the slide 4 is in the viewing position. Inspection of the cam 36 in Figs. 4 and 5 shows that the shutter mechanism 24 is urged into a closed position and retained there for approximately 270 degrees rotation of the cam, and that the spring 32 urges the shutter member 24 into an open position as seen in full lines in Fig. 4 for the remaining number of degrees or approximately 90 degrees.

In the operation of this invention, let us assume initially that the slide advancing mechanism is successively feeding slides 4 into and out of the viewing position. As long as a slide 4 is present in the slide-receiving member 5, the pressure pad 37 will be urged outwardly against the bias of the spring 43 as seen in full lines in Fig. 4 so that the hook 41 and lip 29 are out of engagement with one another whereupon the shutter member 24 is pivotally moved between a closed and open position by rotation of the cam 36 without any interference by the hook 41. Let us now assume that a slide 4 is absent in the tray so that the slide advancing mechanism is unable to feed a slide into the slide-receiving member 5. In the absence of a slide 4, the spring 43 urges the pressure pad 37 against the seat 42 after the previously viewed slide 4 has been retracted therefrom. Since the shutter member 24 is in a closed position with the light-blocking flap 27 obstructing the aperture throughout the retraction of the slide 4, as soon as the previously viewed slide is clear of the receiving member 5 the spring 43 urges the pressure pad 37 against the seat 42 causing the hook 41 to move in over the lip 29. As soon as the cam 36 has been rotated sufficiently so that the flat portion is opposite the pin 31, the spring 32 attempts to urge the shutter member 24 into an open position, but is prevented from doing so by virtue of the lip 29 engaging the hook 41 as seen dotted in Fig. 4. Accordingly, the shutter member 24 will remain in the closed position as long as no slide is advanced into the film-receiving member 5. However, as soon as a slide 4 is advanced into the receiving member 5, the pressure pad 37 is urged outwardly withdrawing the hook 41 from the lip 29 and permitting the shutter mechanism 24 to resume its normal operation free of interference by the hook 41.

The invention has been described in detail with particular reference to preferred embodiments thereof, but it will be understood that variations and modifications can be effected within the spirit and scope of the invention as described hereinabove and as defined in the appended claims.

I claim:

1. In a slide projector, the combination comprising: transport means for moving a slide to and from a viewing position through which a light beam may be directed for projecting the slide image onto a screen; support means responsive to a slide being moved to said viewing position and adapted to support said slide in said viewing position; shutter means movable in timed relation with said transport means between an operative position in which it intercepts the light beam passing through said slide, and an inoperative position in which it is removed from the path of said light beam; and latch means provided by said support and shutter means for releasably interconnecting said support and shutter means, whereby upon operation of said slide projector said shutter means is releasably held by said support means in said operative position as long as said transport means fails to transport a slide to said viewing position, said shutter means being released by said support means for movement between said operative and inoperative positions whenever a slide is moved by said transport means to said viewing position.

2. The invention according to claim 1 wherein said support means comprises an apertured member having a passageway for receiving the slide.

3. The invention according to claim 1 wherein said support means comprises an apertured member having a passageway for receiving the slide, and pressure means for urging the slide against one side of said passageway.

4. The invention according to claim 3 wherein said pressure means comprises an apertured, spring biased pad.

5. The invention according to claim 1 wherein said shutter means comprises a pivotally mounted shutter member having a light-blocking flap.

6. The invention according to claim 1 wherein said shutter means comprises a pivotally mounted shutter member having a light-blocking flap, and actuating means for pivotally moving said shutter member alternately between said operative and inoperative positions.

7. The invention according to claim 6 wherein said actuating means comprises a spring biased cam follower carried by said shutter member for urging said shutter member into said inoperative position, and a cam for urging said cam follower and said shutter member against the bias of the spring into said operative position.

8. The invention according to claim 1 wherein said latch means comprises a hook provided by said support means adapted to releasably engage a lip provided by said shutter member.

9. The invention according to claim 1 wherein said support means comprises an apertured member having a passageway for receiving the slide, and a spring biased pressure pad for urging the slide against one side of the passageway; said shutter means comprises a pivotally mounted shutter member; and said latch means comprises a hook provided by said pressure pad adapted to releasably engage a lip provided by said shutter member.

10. The invention according to claim 1 wherein said support means includes pressure means movable by a slide from a normal first position to a second position as said slide is transported to said viewing position.

11. The invention according to claim 10 wherein said pressure means comprises an apertured spring biased tab, and said latch means comprises a hook provided by said tab and a lip provided by said shutter means, said latch means adapted to releasably hold said shutter means in said operative position when said pressure means is in said first position, and to release said shutter means when said pressure means is in said second position.

References Cited in the file of this patent

UNITED STATES PATENTS

| | | |
|---|---|---|
| 998,305 | Roebuck | July 18, 1911 |
| 1,111,636 | Austin | Sept. 22, 1914 |
| 2,286,322 | Warriner | June 16, 1942 |